US008216955B2

(12) United States Patent  
Guenther et al.

(10) Patent No.: US 8,216,955 B2  
(45) Date of Patent: Jul. 10, 2012

(54) SYNTHESIZED HYBRID ROCK COMPOSITION, METHOD, AND ARTICLE FORMED BY THE METHOD

(75) Inventors: Ross Guenther, Penn Valley, CA (US); James L. Wood, Colfax, CA (US); Carl E. Frahme, Grass Valley, CA (US); Ian I. Chang, North Vancouver (CA); Robert Villwock, Austin, TX (US)

(73) Assignee: Ceramext LLC, Reno, NV (US)

( * ) Notice: Subject to any disclaimer, the term of this patent is extended or adjusted under 35 U.S.C. 154(b) by 0 days.

(21) Appl. No.: 12/767,784

(22) Filed: Apr. 26, 2010

(65) Prior Publication Data

US 2010/0273630 A1    Oct. 28, 2010

Related U.S. Application Data

(63) Continuation of application No. 11/213,218, filed on Aug. 25, 2005, now Pat. No. 7,704,907.

(51) Int. Cl.
*C03C 14/00*     (2006.01)
*C04B 33/24*     (2006.01)
*C04B 35/00*     (2006.01)

(52) U.S. Cl. ............................ 501/155; 501/32; 501/143

(58) Field of Classification Search ........................ None
See application file for complete search history.

(56) References Cited

U.S. PATENT DOCUMENTS

| | | | |
|---|---|---|---|
| 1,809,214 A | 6/1931 | Pine et al. | |
| 1,809,215 A | 6/1931 | Pine et al. | |
| 1,904,568 A | 4/1933 | Taylor | |
| 1,918,064 A | 7/1933 | Taylor | |
| 2,028,240 A | 1/1936 | Palmer | |
| 2,414,029 A | 1/1947 | Duncan | |
| 2,576,565 A | 11/1951 | Brown | |
| 2,783,499 A | 3/1957 | Billen | |
| 2,805,445 A | 9/1957 | Billen | |
| 2,807,082 A | 9/1957 | Zambrow et al. | |
| 2,818,339 A | 12/1957 | Dodds | |
| 2,902,364 A | 9/1959 | Deutsch | |

(Continued)

FOREIGN PATENT DOCUMENTS

CA     2362391     7/2001

(Continued)

OTHER PUBLICATIONS

Burkhard, Dorothee "Kinetics of Crystallization: Example of Micro-Crystallization in Basalt Lava". Contrib. Mineral Petrol, 142, 724-737 (2002).*

(Continued)

*Primary Examiner* — Patricia L Hailey  
*Assistant Examiner* — Sheng H Davis  
(74) *Attorney, Agent, or Firm* — Raj S. Dave; Pillsbury Winthrop Shaw Pittman LLP

(57) ABSTRACT

The invention relates to synthetic hybrid rock compositions, articles of manufacture and related processes employing mineral waste starting materials such as mine tailings, mine development rock, ash, slag, quarry fines, and slimes, to produce valuable articles of manufacture and products, which are characterized by superior physical and structural characteristics, including low porosity, low absorption, increased strength and durability, and retained plasticity. The resulting materials are compositionally and chemically distinct from conventional synthetic rock materials as demonstrated by scanning electron microprobe analysis, and are useful in a wide variety of applications, particularly with respect to commercial and residential construction.

21 Claims, 8 Drawing Sheets

U.S. PATENT DOCUMENTS

| | | | |
|---|---|---|---|
| 2,902,714 A | 9/1959 | Johnson | |
| 2,964,400 A | 12/1960 | Brennan | |
| 2,967,613 A | 1/1961 | Ellis et al. | |
| 3,303,533 A | 10/1963 | King | |
| 3,143,413 A | 8/1964 | Krapf | |
| 3,177,077 A | 4/1965 | Eyraud et al. | |
| 3,258,514 A | 6/1966 | Roach | |
| 3,278,301 A | 10/1966 | Solomir et al. | |
| 3,372,445 A | 3/1968 | Maurer et al. | |
| 3,557,575 A | 1/1971 | Beall | |
| 3,562,879 A | 2/1971 | Cremer et al. | |
| 3,698,848 A | 10/1972 | Low et al. | |
| 3,785,844 A | 1/1974 | Kawano | |
| 3,793,039 A * | 2/1974 | Rostoker | 501/27 |
| 3,816,586 A | 6/1974 | Goosey | |
| 3,827,892 A | 8/1974 | McCauley | |
| 3,870,535 A | 3/1975 | Minnick et al. | |
| 3,928,047 A * | 12/1975 | Kapolyi et al. | 501/6 |
| 3,989,795 A | 11/1976 | McGee | |
| 4,009,015 A * | 2/1977 | McCollister | 65/33.7 |
| 4,043,821 A * | 8/1977 | Le Bras | 501/8 |
| 4,050,142 A | 9/1977 | Takahashi et al. | |
| 4,140,507 A | 2/1979 | Costin et al. | |
| 4,173,484 A | 11/1979 | Kubovits et al. | |
| 4,217,140 A | 8/1980 | Waldhuter et al. | |
| 4,647,426 A | 3/1987 | Fiorentino | |
| 4,779,440 A | 10/1988 | Cleve et al. | |
| 4,785,574 A | 11/1988 | Fiorentino | |
| 4,798,524 A | 1/1989 | Ramm | |
| 4,814,029 A | 3/1989 | Butcher | |
| 4,871,384 A | 10/1989 | Kasuga | |
| 4,963,709 A | 10/1990 | Kimrey, Jr. | |
| 4,973,574 A | 11/1990 | Nishio et al. | |
| 5,043,120 A | 8/1991 | Corrigan | |
| 5,188,989 A | 2/1993 | Winkelbauer et al. | |
| 5,200,370 A | 4/1993 | Lennox et al. | |
| 5,205,991 A | 4/1993 | Avery et al. | |
| 5,286,427 A | 2/1994 | Koumal | |
| 5,297,480 A | 3/1994 | Miyashita et al. | |
| 5,562,765 A | 10/1996 | Brosnan et al. | |
| 5,595,583 A | 1/1997 | Murnick | |
| 5,830,251 A * | 11/1998 | Simpson et al. | 65/17.3 |
| 5,880,439 A | 3/1999 | Deevi et al. | |
| 5,947,887 A | 9/1999 | White et al. | |
| 5,976,432 A | 11/1999 | Yang et al. | |
| 6,124,223 A | 9/2000 | Beall et al. | |
| 6,340,650 B1 | 1/2002 | Haun | |
| 6,361,888 B1 | 3/2002 | Kriven et al. | |
| 6,403,018 B1 | 6/2002 | Goretta et al. | |
| 6,547,550 B1 | 4/2003 | Guenther | |
| 6,825,139 B2 | 11/2004 | Raichel et al. | |
| 7,214,635 B2 | 5/2007 | Gonda et al. | |
| 2002/0004445 A1 | 1/2002 | Beall et al. | |
| 2003/0153466 A1 | 8/2003 | Allen et al. | |
| 2006/0070406 A1 | 4/2006 | Raichel et al. | |
| 2007/0049487 A1 | 3/2007 | Guenther et al. | |

FOREIGN PATENT DOCUMENTS

| | | |
|---|---|---|
| EP | 0280334 | 5/1994 |
| GB | 2022001 | 12/1979 |
| WO | 99/03798 | 1/1999 |

OTHER PUBLICATIONS

W. A. Deer, et al., "An Introduction to the Rock-Forming Minerals," Longman Group Limited; London, 1975.

K. P. Severin, "Energy Dispersive Spectrometry of Common Rock Forming Minerals," Kluwer Academic Publishers, Norwell, Massachusetts, 2004, pp. 1-200.

W. D. Kingery, "Introduction to Ceramics, 1st Edition," John Wiley & Sons, New York, 1960, chapters 2-5.

D. W. Richerson, "Modern Ceramic Engineering, Properties, Processing, and Use in Design," Marcel Dekker, Inc., New York, 1982, pp. 373-647.

B. Bower, "Ancient Mesopotamians Made Rock from Silt," Science News, 153, p. 407, Jun. 27, 1998.

E. C. Stone, et al., "From Shifting Silt to Solid Stone: The Manufacture of Synthetic Basalt in Ancient Mesopotamia," Science, 280, pp. 2091-2093, Jun. 26, 1998.

W. D. Kingery, et al., "Introduction to Ceramics, 2nd Edition," John Wiley & Sons, New York, 1976, chapters 7-14.

ASTM C373-88(1999) "Standard Test Method for Water Absorption, Bulk Density, Apparent Porosity, and Apparent Specific Gravity of Fired Whiteware Products".

International Search Report for PCT International Patent Application No. PCT/US2006/031324, mailed on Sep. 24, 2007.

International Preliminary Report on Patentability for PCT International Patent Application No. PCT/US2006/031324, mailed on Apr. 1, 2008.

Chinese Office Action for Chines Patent Application No. 200680026944.X, mailed on Sep. 18, 2009.

Kojima et al., A New Lunar Meteorite MET 01210: Mare Breccia with a Low-Ti Ferrobasalt, Lunar and Planetary Science XXXVI, 2005.

Extended European Search Report dated Jan. 16, 2012 of EP Application No. 06801221.0 filed Aug. 9, 2006 (10 pages).

Cheeseman, C. R., et al., "Ceramic processing of incinerator bottom ash," Waste Management, vol. 23, No. 10, Jan. 1, 2003, pp. 907-913.

Dana, K., et al., "Partial substitution of feldspar by B.F. slag in triaxial procelain: Phase and microstructural evolution," Journal of the European Ceramic Society, vol. 24, No. 15-16, Dec. 1, 2004, pp. 3833-3839.

Kozul, J., et al., "LEW 85300, 02, 03 Polymict Eucrites Consortium-II: Breccia Clasts, CM Inclusion Glassy Matrix and Assembly History," vol. 19, Mar. 1988, pp. 647-648, Abstracts of the Lunar and Planetary Science Conference.

Spray, John G., "Generation and crystallization of an amphilbolite shear melt: an investigation using radial friction welding apparatus," Contributions to Mineralogy and Petrology, vol. 99, No. 4, Aug. 1, 1988, pp. 464-475.

\* cited by examiner

SYNTHESIZED HYBRID ROCK COMPOSITION, METHOD, AND ARTICLE FORMED BY THE METHOD

CROSS REFERENCE TO RELATED APPLICATIONS

This application is a continuation of and claims the benefit of the earlier filing date of U.S. patent application Ser. No. 11/213,218, filed Aug. 25, 2005, the entire contents of which are incorporated herein by reference.

FIELD OF THE INVENTION

The following invention is generally directed to synthetic hybrid rock compositions of matter, articles of manufacture and related processes employing as starting material mine tailings, mine development rock, ash, slag, quarry fines, slimes, and similar mineral waste materials.

DESCRIPTION OF RELATED ART

Mine reclamation and waste mineral processing are not, by far, new industries. Numerous systems, processes and methods exist to affect environmental mine clean-up, and manufacture useful products from raw materials comprised primarily of waste minerals constituents.

U.S. Pat. No. 3,870,535 discloses a method of treating coal mining refuse to produce a cementitious material, which is self-hardening at atmospheric pressure, and may be used as structural fill, road base material, or alternatively as an aggregate consolidated barrier to prevent penetrating percolation and resulting surface water contamination. The method involves treating coal mining tailings from coal extraction processes with lime (to neutralize sulfuric acid), or lime and a pozzolanic material, such as fly ash, to react at atmospheric pressure for at least several days, in the presence of moisture with sulfate ions that have been released from the tailings, and in some cases also to react with soluble iron products in the tailings. The claimed products are admixtures of coal mining refuse and stoichiometrically distinct concentrations of lime, water and fly ash. The products of the invention are generally of the variety $3CaO$, $Al_2O3$, $3CaSO_4$, $30\text{-}32H_2O$ or $3CaO$, $Al_2O_3$, $CaSO_4$, and $10\text{-}12H_2O$. Permeability testing data for product samples indicated that permeability diminished after completion of a seven day curing period at 100° F. Likewise, compressive strength data indicated that the material's compressive strength, measured in PSI, increased as the curing period progressed. Detailed information regarding the composition's density and plasticity is not disclosed. However, the composition is cementitious in nature, and therefore limited in application and potential utility. Well known disadvantages associated with cement based products include high porosity and structural instability as a result of temperature and climate fluctuations.

U.S. Pat. No. 5,286,427 discloses a method of effecting environmental cleanup by producing structural building materials using mine tailings waste material. The method involves providing facilities for producing the structural building material; providing raw materials for producing the building material, the raw materials comprising unprocessed mine tailings (with a material gradation suitable for immediate use) as a substitute for processed silica sand, plus cement and aluminum powder; analyzing the mine tailings to determine composition and weight percentage amounts of other raw materials present; preparing a slurry from the mine tailings and combining the slurry with other raw materials to form a batch slurry; adjusting amounts of other raw materials in accordance with determined weight percentage amounts in the mine tailings; and processing the batch slurry through the provided facility, including a final curing step that produces the building structural material. Due to the chemical reaction that takes place in the casting stage, the production slurry changes from a fluid form to a quasi-solid form of the building material. The quasi-solid form expands and conforms to a mold shape and facilitates being cut into smaller units prior to curing. The autoclaved aerated cement, as produced and claimed, is of limited utility because the composition lacks plasticity and is therefore incapable of efficient subsequent reformation. Information regarding the material's permeability, porosity, and required curing time period are not disclosed. As previously stated, well known disadvantages associated with cement include high porosity and structural instability as a result of temperature and climate fluctuations.

U.S. Pat. No. 6,825,139 discloses a crystalline composition, a poly-crystalline product, an article of manufacture, and a related process utilizing coal ash as starting material. The process involves mixing coal ash particles with at least one glass forming agent and at least one crystallization catalyst, melting this combination to form a mixture, and cooling the resulting mixture to ambient temperature to form a homogenous, non-porous poly-crystalline product comprising $SiO_2$, $Al_2O$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$. The poly-crystalline products are poly-crystalline materials obtained from glass compositions by means of catalysis crystallization and consisting from one to several crystalline mineralogical phases uniformly distributed in the remaining glass phase. Microstructure assessment, as revealed by electron microscopy, showed a dense glass-ceramic structure with crystal dimensions approximately 1 µm. The composition's mineralogical composition, as demonstrated by X-ray diffraction, revealed that the predominant crystalline phase is anorthite, whereas additional crystalline phases include albite and lithium disilicate. The glass density was found to be up to 2720 kg/m³; the porosity less than 0.02%; and bending strength was up to 150 MPa. However, the composition is heated to temperatures that require addition of at least one crystallization catalyst to effect the various crystalline phases, and to that extent the composition, article and corresponding process are relatively cumbersome and prone to inaccuracy should mistakes occur during catalyst addition.

Bulk processing of relatively homogeneous mined mineral material has also resulted in the creation of numerous ceramic tile products of varying quality and durability. For instance, conventional ceramics produced by processing mixtures of natural mineral constituents and admixtures can be classified according to their glass content as non-vitreous, semi-vitreous, and vitreous. Non-vitreous ceramic, of which Dal-Tile is an example, is generally manufactured from clay, talc, and carbonate minerals, and has water absorption greater than about 7%. No fluxing minerals such as feldspar are used in these compositions. Non-vitreous Dal-Tile of this type has a water absorption of 13-14%, as measured by ASTM C373. This type of tile has virtually no glass content, and gets its structural integrity from solid-state reactions and sintering. Semi-vitreous ceramic, of which Balmor is an example, generally has some glass content and corresponding water absorption between about 4% and about 7%. This is a red body product, its color due to its natural iron content. Such bodies are often made of natural clay-containing earth mixtures which contain natural quartz and feldspar. The latter acts as a fluxing agent to produce a liquid phase during firing, said liquid phase converting to glass during cooling. Vitreous ceramic, including porcelain tile, of which Granitifiandre Kashmir White is an example, has less than 4% water absorption. True porcelain products typically have water absorption values less than about 0.5%. These materials are primarily produced from the raw materials kaolinite clay, quartz, and feldspar. They have a high glass content (typically 20-30%), and are also characterized by a lack of crystalline phases that have precipitated from the melt during cooling. They often contain the mineral mullite ($3Al_2O_3$-$2SiO_2$) formed at elevated firing temperatures from solid state decomposition of the kaolinite raw material.

Commercially Available Ceramic-Tile Materials—Non-Vitreous

FIG. 1 is the scanning electron microprobe back-scattered electron (BSE) image of the non-vitreous commercial ceramic tile manufactured by Dal-Tile™. This BSE image illustrates the typical microfabric of this non-vitreous ceramic tile dominated by discrete flaky particles (1 and 2) that are cemented (sintered) with no apparent glass matrix. The Energy Dispersive X-ray (EDX) microchemical analysis spectra of the dominant flaky particles show a magnesium-silicate chemistry. This composition corresponds with the mineral "enstatite" ($MgO$—$SiO_2$) identified in the X-ray diffraction analysis (XRD) performed on this ceramic tile sample. The enstatite mineral phase did not "grow" or crystallize out of a melt, since none exists, but instead was formed as a high temperature pseudo-morphous solid state replacement mineral for an original largely talc feedstock material. Talc is a hydrated magnesium silicate mineral $Mg_3Si_4O_{10}(OH)_2$).

Light colored (white) reaction rims (3) surround voids (black), some of which contain partially dissolved particles (4). EDX analysis indicates that the rims (3) possess a magnesium aluminum silicate chemistry that corresponds with the mineral cordierite ($MgO$—$Al_2O_3$—$SiO_2$) detected by XRD analysis. The partially dissolved particles in the center of some of the voids have a magnesium oxide chemistry typical of periclase. The abundance of this MgO material was too low to be detectable in XRD analysis.

Minor angular particles (5) with a silica chemistry corresponds to the composition of quartz ($SiO_2$) detected as a minor component in this ceramic tile by XRD analysis.

The abundant void space (black) illustrates the high porosity of this non-vitreous ceramic tile material (6). The absence of significant glassy matrix in this material causes poor grain-to-matrix bonding contact (7). Both of these physical properties contribute to greater water absorption, lower hardness and lower modulus of rupture (MOR—a measure of mechanical strength) determined for this ceramic tile.

Commercially Available Ceramic-Tile Materials—Semi-Vitreous

FIG. 2 is the scanning electron microprobe back-scattered electron (BSE) image of the Balmor™ semi-vitreous commercial ceramic tile. FIG. 2 illustrates the typical microfabric of this semi-vitreous ceramic tile comprised of partially to completely dissolved primary mineral grains. EDX analyses of these mineral grains revealed the chemical compositions, which correlate to the specific minerals identified by XRD analysis as being constituents of this tile material. These include potassium-feldspar (10), plagioclase feldspar (11), quartz (12) and goethite ($Fe(OH)_2$) (13).

These primary mineral grains are cemented by a semi-continuous amorphous glass matrix. The EDX microchemical analysis of two glassy matrix areas (14 and 15) shows that the particular ratios of the cations K, Na, and Ca in the two glassy areas appear to be similar to the two adjacent feldspar compositions (compare 10 with 14 and 11 with 15). This similarity indicates that glass compositions may vary with respect to the cation composition, and are influenced by the specific cation constituents within the adjacent mineral grains that melt or dissolve to form the glass matrix material.

FIG. 2 reveals that the glassy matrix of this semi-vitreous ceramic tile is semi-continuous resulting in a moderate degree of retained porosity 16. This porosity is largely, but not completely, unconnected resulting in lower water absorption properties. The primary grains are not entirely bonded (17) to the glassy matrix which causes a reduction in the durability and hardness of the material.

FIG. 2 also shows no secondary crystallite minerals within the glassy matrix. No evidence is indicated that new crystalline mineral phases have precipitated from the melt during the cooling process.

Commercially Available Ceramic-Tile Materials—Vitreous

FIG. 3 is the scanning electron microprobe back-scattered electron (BSE) image of the Granitifiandre Kashmir White vitreous porcelain ceramic tile. This BSE image illustrates the typical microfabric of this vitreous ceramic tile comprised of remnants of partially dissolved primary grains. The EDX microchemical analysis of some of these grains correlates with the XRD analysis to confirm that the mineralogy of this ceramic tile is dominated by quartz (20), plagioclase feldspar (21) and zircon (22).

FIG. 3 reveals that the quartz grain boundaries show evidence of significant dissolution (20) while the feldspar grains are severely to completely melted or dissolved (21). The minor zircon grains were evidently an admixture to achieve a mottled texture in the porcelain tile body (surface 22). The glassy matrix appears to be continuous, leaving only a few isolated voids or pores and producing low water absorption properties (23).

FIG. 3 also shows no apparent secondary crystallite minerals within the glassy matrix and suggests that no such secondary minerals formed from the melt. However, mullite—a mineral formed through solid state transformation from kaolinite—was identified in XRD analysis. Because of its typical needle-shaped crystal shape and very small particle size, its presence in this ceramic was not positively identified in the BSE analysis. The total atomic weight (density) of mullite may be too similar to the glass matrix rendering it indistinguishable from the glass.

As discussed above, inefficiencies involving conventional methods of processing waste minerals such as mine tailings, and the structural and compositional limitations inherent in conventional ceramic products—particularly with respect to porosity and corresponding water absorption, diminished hardness and low modulus of rupture—demonstrate that a dual need exists for: (1) an effective and efficient strategy to reclaim mineral wastes such as mine tailings at low cost and high safety; and (2) a low cost and easily manufactured non-clay vitreous synthetic rock material with superior, and heretofore collectively unavailable, characteristics including low porosity; impermeability without glazing; high-plasticity for subsequent reformation; and high strength and durability. The disclosed invention addresses these dual needs simultaneously.

BACKGROUND OF THE INVENTION

Mine tailings and mine reclamation efforts have evoked enormous environmental concerns in the United States and abroad. Tailings are waste products remaining in containment areas or discharged to receiving waters after metals are extracted from a particular site, and consist primarily of waste rock containing a variety of rock forming minerals, including as major constituent groups crystalline silica, feldspars and clay minerals; with minor constituent groups including carbonates, sulfates, sulfides and micas. Pollution issues associated with mine tailings relate to the structural integrity and stability of tailings containment areas and the potential for pollution impacts should containment failure occur. At the heart of these concerns is the pollution potential of mine tailings on ground and surface water, and correspondingly how such potential pollution affects people living in the immediate vicinity of tailings containment areas.

The need for effective mine reclamation strategies, and safe disposition of potentially hazardous mine tailings, is widely recognized in the mining and environmental industries alike. There is no legitimate doubt that disposing of mine tailings in a safe manner, as opposed to continually attempting their containment, is desirable from both an environmental safety and economic point of view. Likewise, other mineral waste materials raise similar environmental contamination concerns, and the need for their safe and effective disposition is also well acknowledged.

As far back as ancient Mesopotamia, researchers have located what they believe to be basalt rock slabs formed from silt. It is believed that inhabitants used the basalt rock as a main staple in the region for a variety of purposes, including pottery, architecture, writing materials, art objects and tools. In simulation studies to recreate the basalt rock from silt, researchers were able to approximate the composition and texture of the basalt rock using local alluvial silt as raw starting material, and heating the material within a defined temperature range over a sustained time period. The resulting basalt rock was characterized by matted clinopyroxene crystals embedded in a glassy matrix, with starting material remnants either rarely appearing in, or completely absent from, the final basalt rock. The basalt rock was most likely of limited strength, as it lacked an aggregate microstructure. Due to the observed presence of many large pores, some as big as 3 mm, the basalt had high water absorption, likely well in excess of 7%.

In more recent examples of waste materials, fly ash and bottom ash from burning coal for electric power are largely incombustible residuals formed from inorganic minerals in coal. Roughly hundreds of million tons is produced every year in the USA alone. Fly ash and bottom ash are also produced in waste incinerators and biomass-fueled power plants. Slag mineral waste materials result from metal processing operations. Quarry and dredging operations often produce silicate waste materials such as fines or slimes that must be disposed of in a safe manner.

Relatively pure mineral materials (kaolinite clay, feldspar, quartz, talc, etc.) have conventionally been used to manufacture a variety of ceramic materials with varying compositions and degrees of quality. As previously described, non-vitreous Dal-Tile, semi-vitreous Balmor Tile and vitreous Granitifiandre Kashmir White tile represent a very few. However, these and a vast array of other conventional ceramic products (ceramic tile, dinnerware, sanitaryware, etc.) are typically manufactured by methods that rely on the plasticity and bonding (in the unfired state) of clay—largely kaolinite—and generally use relatively pure raw materials. As previously stated, conventional ceramics also demonstrate a number of undesirable characteristics, including moderate to high porosity and water absorption, low hardness and strength, and the absence of secondary crystallite formation upon cooling, which contributes to product durability. Also, in the manufacture of conventional ceramics, considerable concern is placed on the quality and purity of the raw material ingredients. Further, contaminants in the raw materials can cause considerable damage to the quality of the conventional product in terms of structural integrity and defects in the cosmetic properties. Surprisingly, Applicant's process and composition are tolerant of higher concentrations of many materials that are considered contamination in conventional ceramics manufacture. Such materials include iron, magnesium, manganese, sulfur, and their compounds.

The need exists in the environmental clean-up industry to develop an effective and efficient strategy for reclaiming mines, disposing of mine tailings after mineral extraction at the mine is complete, disposing of mine development rock, disposing of fly ash and bottom ash from power plants or incinerators, disposing of slag, and disposing of fines or slimes. An equally significant need exists in the synthetic rock industry to produce a low porosity, easily manufactured, low absorption vitreous tile in a cost effective and relatively fast manner.

SUMMARY OF THE INVENTION

The applicant's invention provides a crystalline and glass composition derived from processing raw mine tailings and similar waste materials, which can be used to create valuable articles of manufacture and products for a wide variety of uses, particularly, but without limitation, in the commercial and residential construction industry, for example floor, wall, and roof tile, brick, blocks, siding, panels, pavers, countertops, aggregates for road base, and other building materials. The unique composition comprises a clast phase, a glass phase, and a crystalline phase. Said clast phase is further comprised of mineral grains, mineraloid grains, glass spherules, or rock fragments, any of which may have been partially melted, or partially dissolved, or partially transformed by chemical reaction. Said glass phase provides a matrix that cements together the clasts. Said crystalline phase is fully enveloped by the glass phase, having formed by growth from the melt. The unique composition of clasts fused together by a unique glass phase, which further comprises a newly formed crystalline phase, is characterized by a microscopic aggregate breccia (synthetic rock/glass matrix) structure with superior physical and structural characteristics, including low porosity, low absorption, increased strength and durability, retained plasticity to facilitate reformation subsequent to initial processing, and readily distinguishable chemical attributes in comparison to conventional synthetic rock materials, as demonstrated by scanning-electron-microprobe analysis.

The glass phase (glass matrix) is created as a result of partially melting a suite of original raw mineral constituents, which may include feldspar, quartz and mineral materials found in a wide variety of rock types, and which further may be present as individual mineral grains (monomineralic) or as rock fragments (polymineralic). After an optimal melting period, the resulting glass matrix is cooled over an optimal cooling period, and during the cooling period unique silicate and non-silicate minerals with varying proportions of iron, magnesium, calcium and sulfur crystallize from the melt to form small crystallites distributed throughout the glass matrix. Importantly, the newly formed secondary crystallites include specific inosilicate, tectosilicate and sulfate compounds that are not present in the starting raw material, and are not found in commercially-available ceramics in the same fashion. Occasionally, some of these minerals may be found in commercially-available ceramics; however those minerals are not secondary crystallites formed from a melt phase, but rather are remnants of the raw starting material. The specific minerals formed in applicants ceramic materials are influenced by the unique chemistry of the waste mineral feedstock materials such as tailings, ash, etc.

Inosilicates are single-chain and double-chain silicate minerals. The Pyroxene Group of inosilicates comprises single-chain, non-hydrated ferromagnesian chain silicates. The Amphibole Group of inosilicates comprises double-chain, hydrated ferromagnesian chain silicates. Wollastonite is a calcium silicate mineral in the inosilicate group.

Tectosilicates are framework silicate minerals, including minerals such as quartz and the Feldspar Group. Plagioclase feldspar is a solid solution series of feldspar minerals with varying amounts of sodium and calcium.

Sulfate minerals are a group of minerals containing sulfur. Gypsum and anhydrite are calcium sulfates, with anhydrite forming the dehydrated form and gypsum the hydrated form.

Pyroxenes, particularly enstatite and hypersthene (the iron containing version of enstatite), as well as augite, diopside, bronzite, and pigeonite, are not conventionally present in raw starting materials, and have not been detected in vitreous, semi-vitreous or porcelain ceramics. Rather, pyroxenes have been detected, via X-Ray Diffraction analysis (XRD) and Scanning Electron Microprobe analysis (microprobe) using an Energy Dispersive X-ray Spectrometer (EDS), only in high porosity ceramics, such as the non-vitreous ceramic Dal-Tile discussed above. However, microprobe analysis reveals that those pyroxenes in the non-vitreous ceramic have a morphology that indicates to one skilled in the art that they are the result of solid-state chemical reactions rather than crystallization from a melt phase. Conversely, amphiboles, particularly in the form of hornblende, have been detected in raw mine rock materials, but not in processed material, because these compounds do not survive high temperature processing as a result of dehydration and bond degradation during the heating process.

Wollastonite and plagioclase are common ingredients of some non-vitreous conventional ceramics to achieve specific ceramic types and properties. However, wollastonite and plagioclase have not been detected using microprobe analysis and EDS techniques as a newly crystallized phase in conventional ceramics, rather they appear as sintered primary mineral grains.

Anhydrite and/or gypsum are not conventionally present in raw starting materials, and have not been detected in conventional non-vitreous, semi-vitreous or vitreous ceramics.

Applicant's compositions and articles of manufacture comprise both original tailings fragments as well as newly formed mineral phases, which renders them compositionally distinct not only from the raw mine tailings starting material, but—more importantly—from conventional synthetic rock compositions and corresponding articles of manufacture. A key compositional distinction between the raw starting material, applicant's compositions and articles, and conventional synthetic rock compositions is the presence or absence of inosilicate minerals, specifically pyroxenes, wollastonite, tectosilicates, specifically plagioclase feldspar, and sulfates, specifically anhydrite. As more fully set forth below, applicant's compositions and articles contain pyroxene inosilicates, newly formed plagioclase, wollastonite and anhydrite, which heretofore have not been detected in low porosity, vitreous synthetic rock materials. Specific pyroxene minerals that may form in this synthetic rock may include, but are not limited to, one or more of the following: augite, diopside, hypersthene, pigeonite, bronzite and enstatite.

In addition, applicant's invention employs a unique heating and cooling strategy, which completely obviates the need for the addition of crystallization catalysts. That is, heating of the raw material to a temperature at which some, but not all, of the components of the raw material begin to at least partially melt. At these temperatures, a liquid phase is created that can flow to coat individual aggregate particles, bind them together, and fill in void spaces. The liquid phase can also begin to dissolve additional solid material. Upon cooling at reasonable unquenched rates, this liquid phase can partially crystallize without the need for addition of nucleation additives because, due to partial melting, there are already present solid surfaces to initiate crystallization. Mechanical pressure to squeeze the material at temperature can help to distribute the liquid phase among the various solid surfaces and increase binding. Vacuum to remove gas from void spaces can help to eliminate resistance to filling in the voids with the liquid phase.

Typically the first components of the raw material to liquefy are glass particles or feldspars, many of which liquefy at temperatures of approximately 1050 to 1300 degrees C. Preferably, the raw material comprises glass or feldspar that becomes liquid at temperatures in the range of 1100 to 1200 degrees C. Cooling from these temperatures preferably takes place at a rate slow enough to allow crystallization to occur, preferably about 1 to 50 degrees C. per minute, more preferably about 5 to 20 degrees C. per minute, and most preferably about 10 degrees C. per minute when cooling is initiated from the peak temperature for the first few hundred degrees of cooling. Cooling at a maximum rate of 10 degrees C. per minute is also especially preferred as the material passes through the temperature range of 600 to 500 degrees C., to avoid fracture due to the associated volume change of the beta-to-alpha phase transition of any quartz that may be present in the material.

In the embodiments and examples of the present invention that follow, an amount of mine tailings, for example Historic Idaho-Maryland Mine Tailings ("HIMT"), containing both rock fragments and individual mineral grains, is heated in a forming chamber to an optimal temperature, preferably in the range of 1100 to 1200 degrees C., and thereby partially melted over an optimal period of time, preferably about 0.5 to 6 hours. During the partial melting process, the HIMT raw material is simultaneously exposed to pressure modification, which preferably is the application of mechanical force to the material in the range of 1 to 200 psi, and which further may also be the application of vacuum to reduce the absolute pressure to within the range of about 1 to 600 mbar in order to remove interstitial gas phase.

Heating the HIMT raw material with pressure modification results in a partially melted matrix, which is then allowed to cool over an optimal period of time. During the cooling period, newly formed mineral crystallites with varying proportions of silicon, aluminum, iron, magnesium, calcium, and sulfur crystallize from the initial raw material melt to form small crystallites distributed throughout a glass matrix. As previously stated, the invention does not employ added crystallization catalysts or nucleating agents to facilitate the crystallization process.

The newly formed crystallized minerals occurring in the glass matrix comprise a combination of minerals from the Pyroxene Group, Plagioclase Feldspar Group and Sulfate Group. Morphological characteristics of the newly crystallized minerals indicate their secondary growth from the initial raw material melt, as opposed to from a solid state glass reaction. Most notably, these secondary growth indicators include the newly formed minerals' generally uniform size, crystalline morphology and uniform composition throughout the glass matrix.

In one embodiment, the invention provides a vitreous, non-porous, impermeable polycrystalline composition comprising an amount of clasts, an amount of glass matrix, and an amount of at least one secondary crystalline phase. Said clasts comprise grains of single minerals, such as quartz, or rock fragments, or unmelted glass fragments, or mineraloid grains. Said glass matrix is distributed between the clasts, bonding to them and filling in the nearly all of the interstitial space. Said at least one secondary crystalline phase is contained within the glass matrix, and is comprised of crystals formed from a melt with a mineral composition selected from the group consisting of ferromagnesian minerals, pyroxenes (for example, clinopyroxene, orthopyroxene, augite, diopside, hypersthene, pigeonite, bronzite, enstatite), illmanite, rutile, wollastonite, cordierite, and anhydrite.

In one embodiment, the invention provides a method for processing mine tailings resulting in a vitreous, non-porous, impermeable polycrystalline composition. Said method comprises air drying a sampling of mine tailings to less than 3% moisture; screening the mine tailings to remove material larger than 516 microns; and calcining the mine tailings in air at approximately 900 degrees C. The mine tailings are then mechanically compacted in a tube with an approximate pressure of 350 psi at an approximate temperature of 1130 degrees C. for approximately 60 hours, and subsequently cooled at a rate of approximately 1 to 3 degrees C. per minute, forming said composition, comprising a clast phase, a glass phase, and at least one crystalline phase. Said clast phase comprises grains of single minerals, such as quartz, or rock fragments. Said glass phase is distributed between said clast phase, bonding to clast particles and filling in nearly all surrounding interstitial space. Said at least one crystalline phase is contained within said glass phase, and comprises crystals formed from a melt with a mineral composition consistent with minerals selected from the group consisting of bronzite, augite and pigeonite.

In another embodiment, the invention provides a method for processing mine tailings resulting in a vitreous, non-porous, impermeable polycrystalline composition. Said method comprises air drying a sampling of mine tailings to less than 3% moisture; screening the mine tailings to remove material larger than 516 microns; and calcining the mine tailings in air at approximately 900 degrees C. The mine tailings are then mechanically compacted in a tube with an approximate pressure of 300 psi at an approximate temperature of 1140 degrees C. for approximately 6 hours, and subsequently cooled at a rate of approximately 10 to 20 degrees C. per minute, forming said composition, comprising a clast phase, a glass phase, and at least one crystalline phase. Said clast phase comprises grains of single minerals, such as quartz, or rock fragments. Said glass phase is distributed between said clast phase, bonding to clast particles and filling in nearly all surrounding interstitial space. Said at least one crystalline phase is contained in said glass phase and comprises crystals formed from a melt with a mineral composition consistent with minerals selected from the group consisting of bronzite, augite, pigeonite, anhydrite and ilmanite.

In another embodiment, the invention provides a method for processing metavolcanic mine development rock resulting in a vitreous, non-porous, impermeable polycrystalline composition. Said method comprises air drying a sampling of the development rock to less than 3% moisture; and screening the development rock through a 516 micron screen. Development rock powder is then processed through the apparatus described in U.S. Pat. No. 6,547,550 (Guenther) at a temperature of approximately 1160 degrees C., with mechanical pressure oscillating between approximately 30 psi and 160 psi for a defined time period, in a partial vacuum atmosphere for approximately 60 minutes, and subsequently cooled at an approximate rate of 5 to 15 degrees C. per minute, forming said composition, comprising a clast phase, a glass phase and at least one crystalline phase. Said clast phase comprises polymineralic and monomineralic clasts. Said glass phase is distributed between said clast phase, bonding to clast particles and filling in nearly all surrounding interstitial space. Said at least one crystalline phase is contained in said glass phase and comprises crystals formed from a melt with a mineral composition consistent with minerals selected from the group consisting of augite, pigeonite, maghemite and ilmanite.

In another embodiment, the invention provides a method for processing coal fly ash resulting in a vitreous, non-porous, impermeable polycrystalline composition. Said method comprises air drying a sampling of the coal fly ash to less than 3% moisture; screening the coal fly ash with a 516 micron screen; and thereafter calcining the coal fly ash. The coal fly ash is then mechanically compacted at an approximate pressure of 300 psi in a tube at an approximate temperature of 1115 degrees C. for approximately 10 hours, and subsequently cooled at an approximate rate of 10 to 20 degrees C. per minute, forming said composition, comprising a clast phase, a glass phase, and at least one crystalline phase. Said clast phase comprises remnant clasts from the original feedstock constituents. Said glass phase is distributed between said clast phase, bonding to clast particles and filling in nearly all surrounding interstitial space. Said at least one crystalline phase is contained in said glass phase and comprises crystals formed from a melt with a mineral composition consistent with minerals selected from the group consisting of wollastonite, plagioclase feldspar, anhydrite, and calcium sulfate.

In another embodiment, the invention provides a method of processing waste materials selected from the group consisting of mine tailings, waste rock, quarry waste, slimes, fly ash, bottom ash, coal ash, incinerator ash, wood ash, and slag, resulting in a vitreous, non-porous, impermeable polycrystalline composition. Said method comprises subjecting the waste materials to a screening apparatus; conveying the waste materials from said screening apparatus to a heated rotating chamber for chemical transformation; conveying the waste materials from said heated rotating chamber to a second heated chamber optionally fixed with a vacuum; conveying the waste materials from said second heated chamber to a third heated chamber positioned within a heating element; applying pressure to the waste materials in said third heated chamber forming a hybrid rock; extruding said hybrid rock through a die device and removing said hybrid rock from said third heated chamber for subsequent use or further modification.

The benefits, advantages and surprising discoveries resulting from the present invention are, in a word, remarkable. First and foremost, a surprising discovery regarding applicant's invention is the presence of pyroxene inosilicates in the final composition and corresponding articles. Heretofore, pyroxene mineral compounds have not been detected in vitreous, low-porosity, low absorption synthetic rock materials such as applicant's present invention. Rather, pyroxenes have only been conventionally detected in highly porous, non-vitreous materials.

Also surprising is the fact that applicant's invention achieves maximum crystallization without the addition of crystallization catalysts or other nucleating agents. The raw material in applicant's invention is not heated beyond its melting point, but rather is only partially melted, which preserves crystallization nuclei sites already present in the glass matrix. Conversely, conventional synthetic rock compositions must employ crystallization catalysts to facilitate crystal formation because corresponding raw materials are heated to above their melting point and completely melted to a homogenous state during processing, which destroys potential crystallization sites. Conventional crystallization catalysis is required to provide a site for crystallization.

Yet another surprising discovery regarding applicant's invention is that the invention's glass matrix can comprise various amounts of glass, but that with less than approximately 20% glass the composition achieves impermeability. Conventional low or non-permeable synthetic rock materials require a high glass content to achieve impermeability.

The invention also has the advantage of providing compositions of matter comprising crystalline particles within a glass-binding liquid matrix, which allows the compositions to maintain a significant amount of plasticity at high temperature, unlike conventional clay tile. With this heightened plasticity level the compositions can, while initially heated or re-heated, be pressed, rolled or injected into other shapes and a variety of useful products after initial preparation. For instance, fine grained versions of the solid compositions can be pressed into aggregates and cobbles for a variety of construction uses, including for use in cement, road base and cobblestones. Alternatively, commonly known abrasives, such as silica carbide, quartz and garnet, can be added to the composition for subsequent use in sanding blocks and grinding wheels.

Another advantage of the present invention is that the solid compositions and corresponding articles of manufacture are impermeable without the need for glazing. The invention's impermeability is directly related to the fact that, unlike conventional synthetic rock materials, the composition and articles contain essentially zero open porosity, due to the continuous glass matrix structure surrounding crystallites distributed throughout therein. With the exception of certain rare vitreous expensive clay products, such as porcelain, conventional synthetic rock and ceramic products require glazing to achieve impermeability.

As previously stated, applicant's invention contains virtually zero open porosity, which results in less porous and more impermeable articles as compared to conventional ceramic materials. Surprisingly, voids (closed pores) may be induced in applicant's invention to result in a lighter weight construction-type material, without compromising the invention's impermeable characteristics.

Other aspects and alternatives or preferred embodiments of the invention exist. They will become apparent as the specification proceeds.

DETAILED DESCRIPTION OF THE INVENTION

The First Embodiment

This embodiment is an apparatus and process for processing mine tailings employing a slow cooling schedule, which results in Applicant's composition and corresponding articles of manufacture.

TABLE 1

Composition of some feed materials

| | Idaho-Maryland mine tailings mass % | Idaho-Maryland development rock mass % | coal fly ash mass % |
|---|---|---|---|
| loss on ignition | 11.29 | 4.19 | 19.1 |
| SiO2 | 55.6 | 48.7 | 39.84 |
| Al2O3 | 9.89 | 14.8 | 13.23 |
| Na2O | 1.99 | 3.40 | 1.77 |
| MgO | 5.01 | 8.17 | 1.66 |
| K2O | 1.52 | 0.33 | 0.67 |
| CaO | 7.03 | 9.23 | 19.52 |
| Fe2O3 | 5.12 | 9.72 | 2.62 |
| MnO | 0.11 | 0.15 | 0.02 |
| P2O5 | 0.18 | 0.12 | 0.42 |
| TiO2 | 0.67 | 0.93 | 0.62 |
| C (inorganic) | 0.23 | 0.55 | 5.16 |
| C (organic) | 2.33 | 0.02 | 1.65 |
| C (total) | 2.56 | 0.57 | 6.81 |
| S | 0.41 | 0.16 | 3.86 |

EXAMPLE 1

A sample of tailings from the Idaho-Maryland gold mine, having the general composition shown in Table 1, was air-dried to less than 3% moisture and screened to remove material larger than 516 microns (30 mesh). The raw tailings material was calcined in air at 900 degrees C. Following calcining, the material, without additives, was mechanically compacted using a ram at a pressure of approximately 350 psi within a nitride-bonded-silicon-carbide process tube at a temperature of 1130 degrees C. for an extended period of time, approximately 60 hours at temperature. The material was then slowly cooled, at a rate of 1 to 3 degrees C. per minute, forming a synthetic rock hybrid material, which was then removed from the process tube. Test specimens of the resulting synthetic rock hybrid material had an average modulus of rupture of about 85 MPa (12320 psi), and an average water absorption of about 0.3% as determined by method ASTM C373. Other resulting data are shown in Table 2.

TABLE 2

Physical properties of example synthetic rock hybrid materials.

|  | Ex. 1 | Ex. 2 | Ex. 3 | Ex. 4 |
|---|---|---|---|---|
| modulus of rupture (psi) | 12320 | 6060 | 9280 | 8230 |
| apparent porosity (%) ASTM C373 | 0.7% | 6.8% | 2.3% | 1.8% |
| water absorption (%) ASTM C373 | 0.3% | 3.2% | 0.8% | 0.7% |
| apparent specific gravity ASTM C373 | 2.67 | 2.32 | 2.83 | 2.53 |
| bulk density (g/cm3) ASTM C373 | 2.65 | 2.16 | 2.76 | 2.49 |

Figure 1:
FIG. 1 is a micrograph obtained from scanning electron microprobe analysis of commercially available (Dal-Tile) non-vitreous ceramic tile.
Figure 2:
FIG. 2 is a micrograph obtained from scanning electron microprobe analysis of commercially available (Balmor) semi-vitreous ceramic tile.
Figure 3:
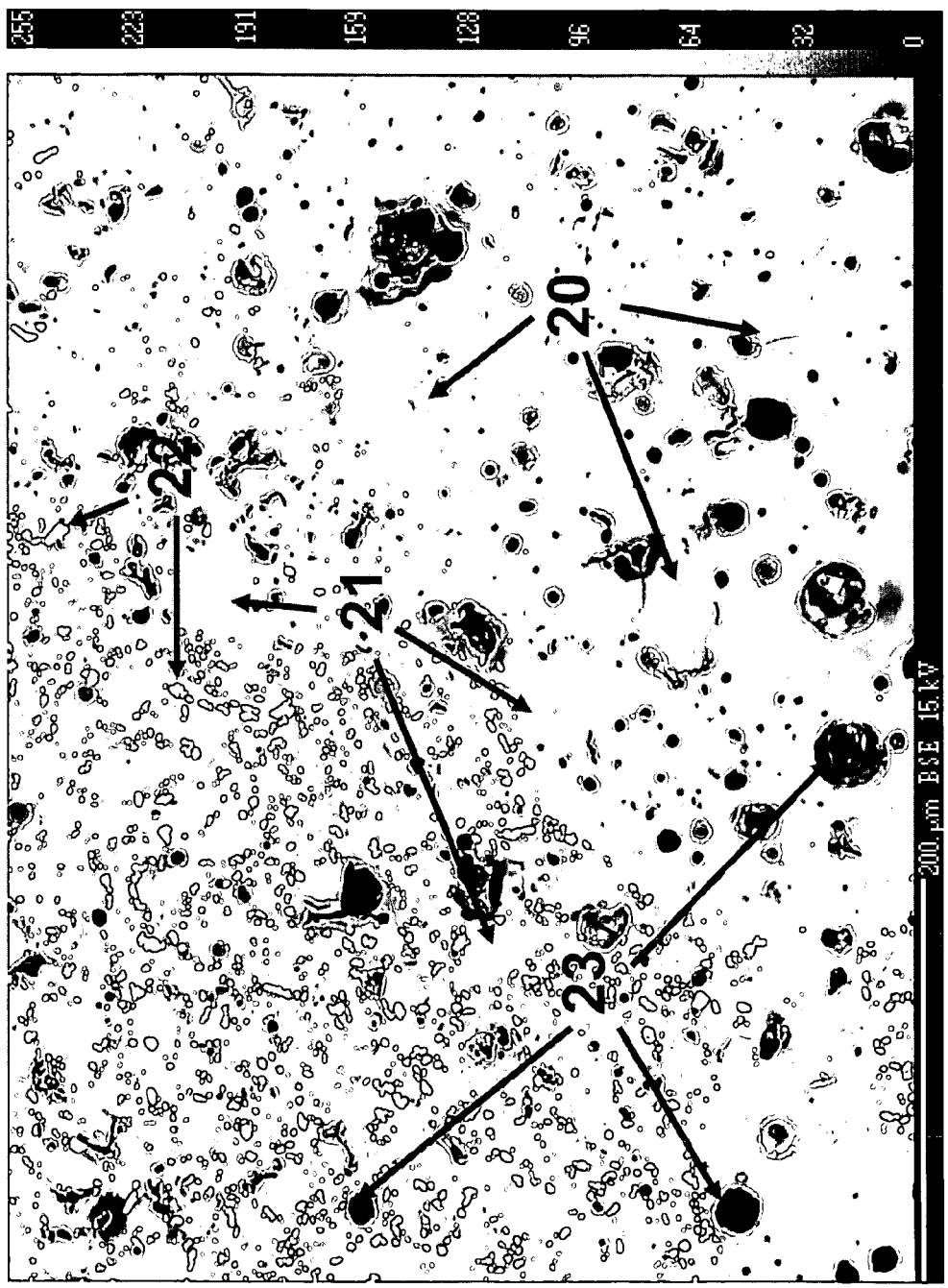
FIG. 3 is a micrograph obtained from scanning electron microprobe analysis of commercially available (Granitifiandre, Kashmir White) vitreous ceramic tile.
Figure 4:
FIG. 4 is a micrograph obtained from scanning electron microprobe analysis of an article of manufacture resulting from Applicant's method of processing mine tailings, including an illustration of the article's composition.

FIG. 4 is the scanning electron microprobe back-scattered electron (BSE) image of this synthetic rock hybrid material of Idaho Maryland mine tailings feedstock. FIG. 4 illustrates the three characteristic phases typical of the unique microfabric of this synthetic rock material. These three phases include clasts (partially dissolved remnant primary grains of the tailings feedstock); a glass phase derived from the partial melting of primary mineral grains; and a secondary crystalline phase comprised of similarly sized crystallites that occur in the glass phase. The latter secondary minerals crystallized from the melt prior to cooling and formation of the glass phase. FIG. 4 shows a remnant primary quartz grain with rounded edges indicating dissolution of its formerly angular grain boundaries (31). The nearly complete melting of most other primary mineral constituents of the original feedstock components such as feldspar leaves little evidence of their existence in this synthetic rock other than mottled areas that retain the chemical signature of the parent mineralogy (32).

The glass phase (33) with an aluminosilicate composition contains trace amounts of cations such as potassium, calcium, sodium, magnesium, and iron (33). EDS microchemical analysis of the glass throughout the ceramic indicates that the glass composition is heterogeneous and varies with respect to the aluminum:silicon ratio as well as the trace cation content (34).

The newly formed (secondary) crystallite comprises the crystalline phase of this synthetic rock. The longer processing time resulted in secondary crystallites comprising 40-50% of the volume of this material. The crystallites appear in two recognizable morphologies each with distinct chemistries as determined by EDS. Some crystallites appear in narrow lath and skeletal shapes and occur singly and in clusters (35). Crystallites of this morphology uniformly possess a chemistry most similar to the bronzite species of pyroxene having high magnesium but low calcium and iron contents (35). The size of the lath shaped crystallites ranges from 1 to 3 μm in width and from 5 to 25 μm in length.

The other common morphology of crystallites is an equant blocky shape similarly occurring singly and in clusters (36). This latter crystallite morphology is associated with calcium to iron ratios similar to augite or pigeonite varieties of pyroxene having high calcium but low iron contents. The size of these blocky crystallites ranges from 4 to 15 μm.

The continuous glass phase in this synthetic rock material leaves widely spaced isolated voids with little or no communication between them resulting in very low absorption values (37).

The Second Embodiment

This embodiment is a method of processing mine tailings employing a fast cooling schedule, which results in Applicant's composition and corresponding articles of manufacture.

EXAMPLE 2

A sample of tailings from the Idaho-Maryland gold mine, having the general composition shown in Table 1, was air-dried to less than 3% moisture and screened to remove material larger than 516 microns (30 mesh). The raw tailings material was calcined in air at 900 degrees C. Following calcining, the material, without additives, was mechanically compacted using a ram at a pressure of approximately 300 psi within a nitride-bonded-silicon-carbide process tube at a temperature of 1140 degrees C., with a residence time of approximately 6 hours at temperature. The material was then extruded through a rectangular die (15.2 by 1.3 cm) with a land length of 3.5 cm, and subsequently cooled at a rate of about 10 to 20 degrees C. per minute, forming a synthetic rock hybrid material. Test specimens of the resulting synthetic rock hybrid material had an average modulus of rupture of about 42 MPa (6060 psi), and an average water absorption of about 3.2% as determined by method ASTM C373. Other resulting data are shown in Table 2.

Figure 5:
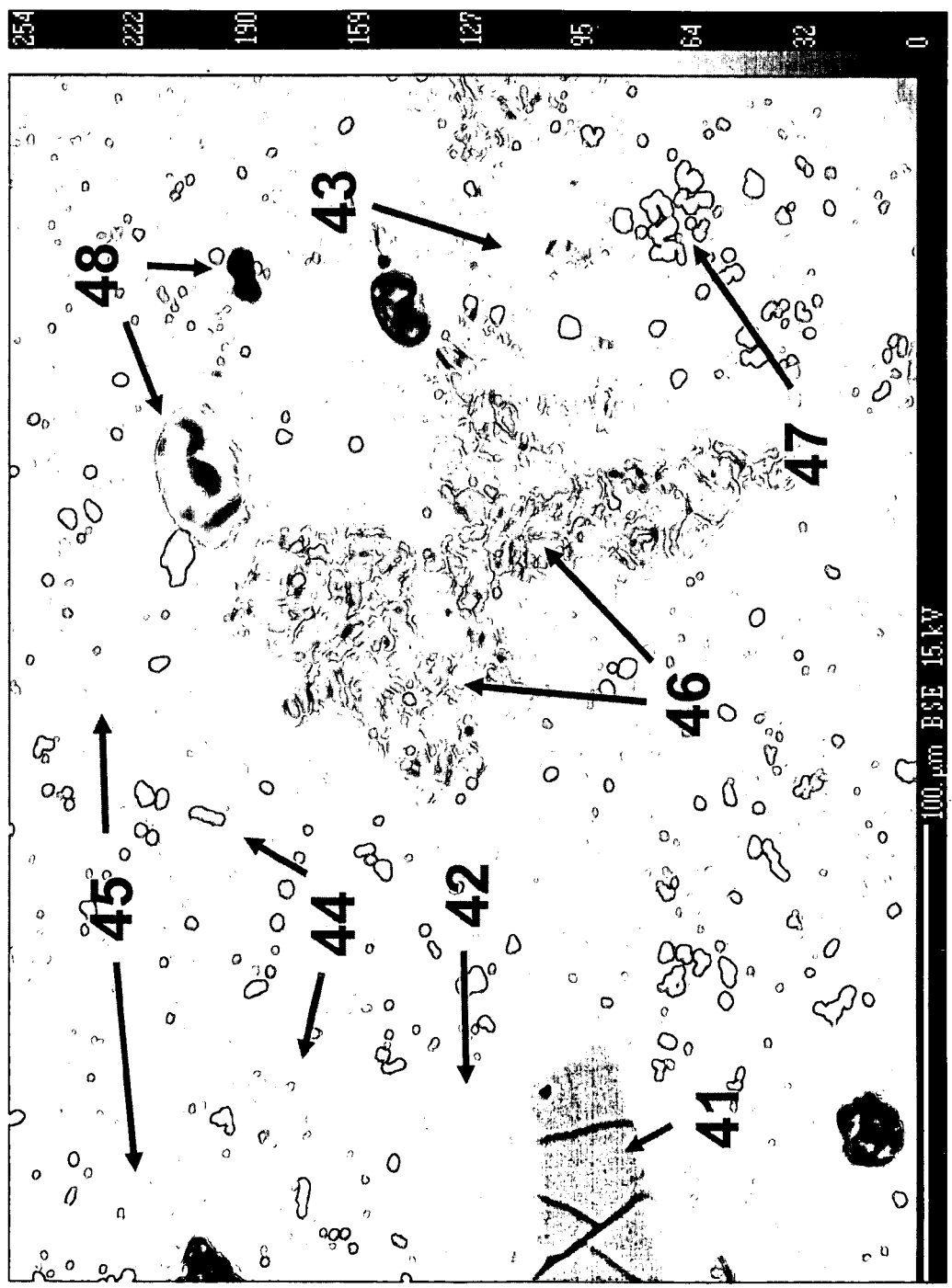
FIG. 5 is a micrograph obtained from scanning electron microprobe analysis of an article of manufacture resulting from Applicant's method of processing mine tailings, including an illustration of the article's composition.

FIG. 5 shows the scanning electron microprobe back-scattered electron (BSE) image of the resulting synthetic rock hybrid material. FIG. 5 illustrates the three characteristic phases typical of the unique microfabric of this synthetic rock material. These three phases include clasts (partially dissolved remnant primary grains of the tailings feedstock); a glass phase derived from the partial melting of primary mineral grains; and a secondary crystalline phase comprised of similarly sized crystallites enveloped in the glass phase. The latter secondary minerals crystallized from the melt during cooling, likely prior to the formation of the glass phase. FIG. 5 shows a remnant primary quartz grain with rounded edges indicating dissolution of its formerly angular grain boundaries (41). The nearly complete melting of most other primary mineral constituents of the original feedstock components leaves little evidence of their existence in this synthetic rock.

The glass phase (42) with an aluminosilicate composition contains trace amounts of cations such as potassium, calcium, sodium, magnesium, and iron (42). EDS microchemical analysis of the glass throughout the ceramic indicates that the glass composition is heterogeneous and varies with respect to the aluminum:silicon ratio as well as the trace cation content (43).

Four newly formed secondary crystalline phases are apparent in this synthetic rock material including two distinct pyroxene types, anhydrite and ilmanite. Pyroxene crystallites appear in two morphologies each with distinct chemistries as determined by EDS. One pyroxene crystallite morphology is a narrow lath shape (44). The lath type pyroxenes uniformly possess a chemistry most similar to the bronzite species having high magnesium but low calcium and iron contents (44). The crystallite sizes range from 1.5 to 3 μm in width and from 5 to 50 μm in length. The faster processing time to produce this material (relative to Example 1) prevented complex cluster development of the crystallites. Other pyroxene crystallites occur with an equant blocky shaped morphology (45). This latter type pyroxene occurs singly and in simple clusters. This latter pyroxene crystallite morphology is associated with calcium to iron ratios similar to augite or pigeonite varieties with high calcium but low iron contents. The blocky crystallites range from 1 to 5 μm.

Sulfur in this synthetic rock has combined with calcium to form crystallite clusters of anhydrite (46). Individual crystallites within the clusters range from 2 to 7 μm in size.

Small similarly sized crystallites of ilmanite (iron titanium oxide) of 1 to 5 μm in size appear randomly arranged in the glassy matrix (47).

The continuous glass phase in this synthetic rock material leaves few and widely spaced isolated voids (48) with little or no communication between them, resulting in very low absorption values.

The Third Embodiment

This embodiment is a method of processing metavolcanic mine development rock employing a fast cooling schedule, which results in Applicant's composition and corresponding articles of manufacture.

EXAMPLE 3

A composite of drill-core samples taken from metavolcanic (andesite, dacite, diabase, and others) rock from the Idaho-Maryland mine ("development rock") was air-dried to less than 3% moisture, and ground to a size fine enough to pass 100% through a 516-micron (30-mesh) screen. The development rock powder had a composition as shown in Table 1. The development rock powder, without additives, was processed through the apparatus described in U.S. Pat. No. 6,547,550 (Guenther) at a temperature of 1160 degrees C., with a mechanical pressure oscillating between about 160 psi and 30 psi with a period of oscillation of 10 minutes, in a partial vacuum atmosphere (about 170 mbar absolute pressure), with a residence time of about 60 minutes before extruding the consolidated plug of synthetic rock hybrid material. Following the extrusion, the plug was cooled at a rate of about 5 to 15 degrees C. per minute. Test specimens of the resulting synthetic rock hybrid material had an average modulus of rupture of about 64 MPa (9280 psi), and an average water absorption of about 0.8% as determined by method ASTM C373. Other resulting data are shown in Table 2.

Figure 6:
FIG. 6 is a micrograph obtained from scanning electron microprobe analysis of an article of manufacture resulting from Applicant's method of processing mine development rock, including an illustration of the article's composition.

FIG. 6 is the scanning electron microprobe back-scattered electron (BSE) image of the resulting synthetic rock material from composite Idaho Maryland development rock feedstock. FIG. 6 illustrates the three characteristic phases typical of the unique microfabric of this synthetic rock material that collectively comprise an aggregate (or breccia) arrangement. These three phases include partially dissolved remnant primary grains of the original metavolcanic feedstock constituents; a glass phase derived from the partial melting of primary mineral grains; and secondary crystalline phases comprised of similarly sized crystallites enveloped in the glass phase. The latter secondary minerals crystallized from the melt during cooling, likely prior to the formation of the glass phase. FIG. 6 shows numerous remnant grains of a variety of primary constituents forming a relatively coarse clasts fraction. These primary lithic grains include polymineralic metavolcanic rock fragments (51) and monomineralic mineral grains (52). Specific minerals that occur either in monomineralic grains comprised of a single mineral or polymineralic rock fragments comprised of multiple minerals include plagioclase feldspar (53); pyroxene (54); and remnants of degraded chlorite (55). Other primary minerals inherited from the feedstock constituents that also occur but not illustrated in FIG. 6 include sphene, quartz and hematite.

The partial melting of feldspar (53) occurring in the metavolcanic feedstock contributes to the formation of a melt phase that created a glass matrix upon cooling (56). The rounded feldspar grain margins indicate dissolution or melting of its formerly angular grain boundaries. The glass phase (56) with an aluminosilicate composition contains trace amounts of cations such as potassium, calcium, sodium, magnesium, and iron. EDS microchemical analysis of the glass throughout the ceramic indicates that the glass composition is heterogeneous and varies with respect to the aluminum:silicon ratio as well as the trace cation content (57).

FIG. 6 illustrates the formation of the dominant secondary crystalline phase that crystallized from the melt. Clusters of pyroxene crystallites appear in various locations enveloped by the glass phase (58). The individual pyroxene crystallites within the clusters possess an equant blocky morphology with calcium to iron ratios similar to augite or pigeonite varieties. Other secondary minerals that crystallized from the melt but not illustrated in FIG. 6 include maghemite (spinel group) and ilmanite (iron titanium oxide).

The continuous glass phase of this synthetic rock material envelops nearly the entire grain margin of the clasts resulting in widely spaced isolated voids (59). There is little or no communication between the isolated voids resulting in the very low absorption values determined for this synthetic rock hybrid material.

The unique structural attribute of this synthetic rock material is the aggregate breccia microfabric created by the three important components that includes 1) the primary remnant clasts, 2) the glass phase, and 3) the secondary crystallite phase. This aggregate breccia structural arrangement of components (or constituents) creates a strong aggregate microfabric with superior strength and durability properties unique to this synthetic rock material.

The Fourth Embodiment

This embodiment is a method of processing coal fly ash employing a fast cooling schedule, which results in Applicant's composition and corresponding articles of manufacture.

EXAMPLE 4

Coal fly ash material was obtained from a coal power plant, specifically Valmy train 2 in Winnemucca, Nev. The composition of the raw material is shown in Table 1. The material was air-dried to less than 3% moisture, and screened to pass 100% through a 516-micron (30-mesh) screen. Following calcining, the calcined coal fly ash material, without additives, was mechanically compacted using a ram at a pressure of approximately 300 psi within a nitride-bonded-silicon-carbide process tube at a temperature of 1115 degrees C., with a residence time of approximately 10 hours at temperature. The material was then extruded through a cylindrical die, and subsequently cooled at a rate of about 10 to 20 degrees C. per minute, forming a synthetic rock hybrid material. Test, specimens of the resulting synthetic rock hybrid material had an average modulus of rupture of about 57 MPa (8230 psi), and an average water absorption of about 0.7% as determined by method ASTM C373. Other resulting data are shown in Table 2.

Figure 7:
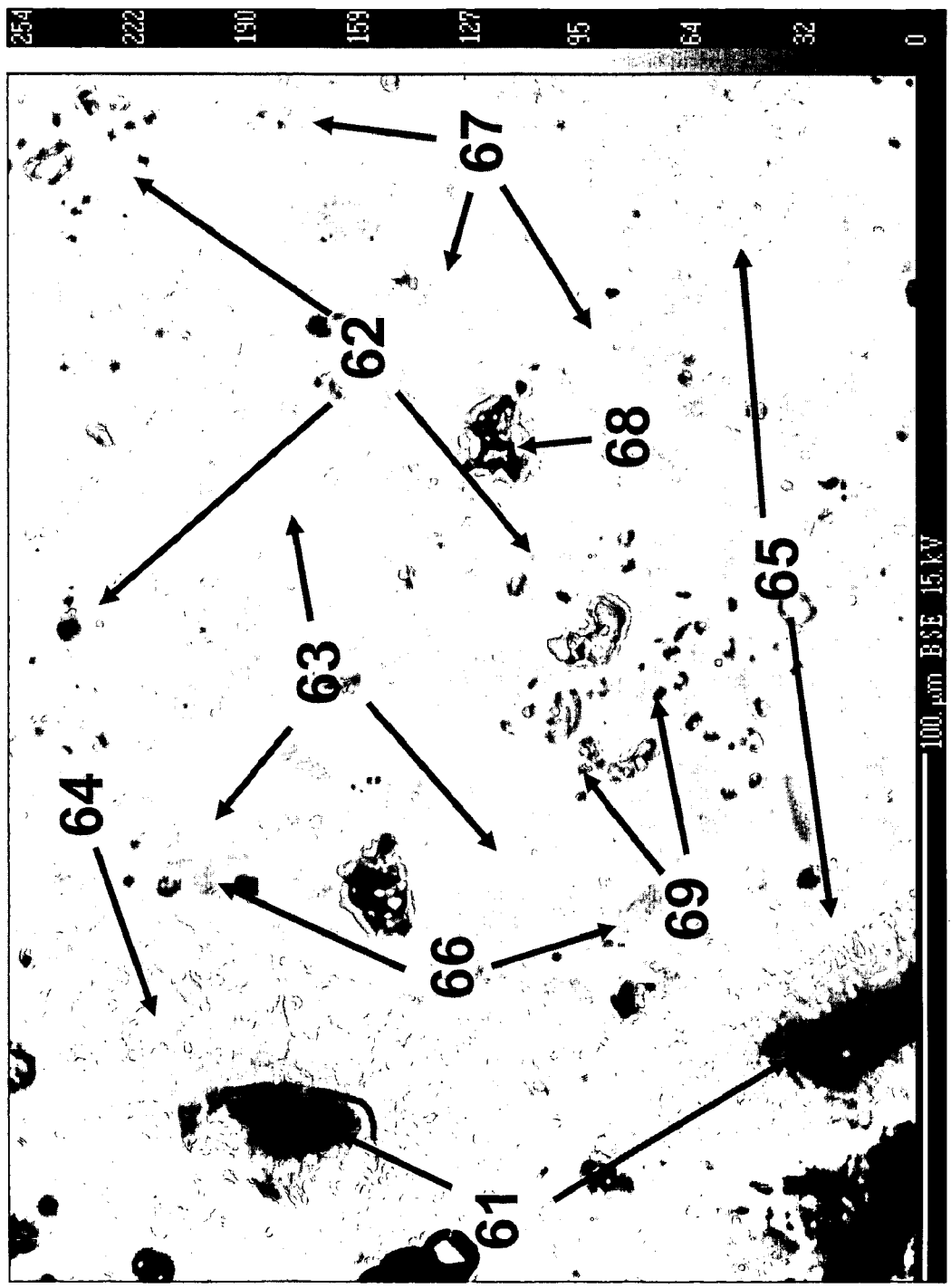
FIG. 7 is a micrograph obtained from scanning electron microprobe analysis of an article of manufacture resulting from Applicant's method of processing coal fly ash, including an illustration of the article's composition.

FIG. 7 is the scanning electron microprobe back-scattered electron (BSE) image of the synthetic rock material fabricated from coal fly ash waste material feedstock. FIG. 7 illustrates the three characteristic phases typical of the unique microfabric of this synthetic rock material that collectively comprise an aggregate structural arrangement. These three phases include clasts of partially dissolved remnant primary grains of the original fly-ash feedstock constituents; a glass phase derived from the partial melting of primary mineral and fly-ash grains; and secondary crystalline phases comprised of similarly sized crystallites enveloped in the glass phase. The latter secondary minerals crystallized from the melt during cooling, likely prior to the formation of the glass phase. FIG. 7 shows remnant grains of primary constituents that remain in this synthetic rock including quartz (61) and fly-ash glass spherules (62).

The partial melting of fly-ash glass spherules—the dominant feedstock constituent—created a melt phase that formed a continuous glass matrix upon cooling (63). The glass phase (63) with an aluminosilicate composition contains trace amounts of cations such as potassium, calcium, sodium, magnesium, and iron. EDS microchemical analysis of the glass throughout the ceramic indicates that the glass composition is heterogeneous and varies with respect to the aluminum:silicon ratio as well as the trace cation content (64).

FIG. 7 illustrates the formation of up to four secondary crystalline phases that crystallized from the melt during the cooling process. These secondary crystalline phases include: clusters of wollastonite crystallites (65) some of which nucleated on remnant primary quartz grains (61); lath-shaped plagioclase feldspar (66) and pyroxene (67) crystallites randomly distributed in the glass phase; and blocky anhydrite crystallites (calcium sulfate) not shown in FIG. 7. The anhydrite phase is a major component of this synthetic rock material and serves as a major receptacle for the sulfur that was a dominant constituent of the coal fly-ash waste material.

Individual wollastonite crystallites range in size from 1 to 6 µm. The lath shaped plagioclase and pyroxene crystallites range from 1 to 5 µm in width and 2 to 15 µm in length. The larger blocky anhydrite phenocrysts are a size that can be resolved with the polarized light microscope with typical sizes ranging from 10 to 70 µm.

The continuous glass phase of this synthetic rock material envelops the entire grain margin of the primary and secondary mineral grains resulting in few if any isolated voids (68). The predominant void space in this synthetic rock was inherited and associated with the primary fly-ash spherules (69). There is little or no communication between any of the isolated voids resulting in the very low absorption values determined for this synthetic rock material.

The unique structural attribute of this synthetic rock material is the aggregate breccia microfabric created by the three important components that includes 1) the primary remnant clasts, which in this example include mineral grains and mineraloid grains such as glassy fly-ash spherules, 2) the glass phase, and 3) the secondary crystallite phase. The cluster development of the large wollastonite crystallites the crystallized around primary quartz grains contributes to the coarse aggregate fraction (65). This aggregate breccia structural arrangement of components (or constituents) creates a strong aggregate microfabric with superior strength and durability properties unique to this synthetic rock material.

The Fifth Embodiment

This embodiment is a method of processing waste mineral materials such as mine tailings, ash, slag, slimes, and the like, which results in Applicant's composition and corresponding articles of manufacture.

Figure 8:
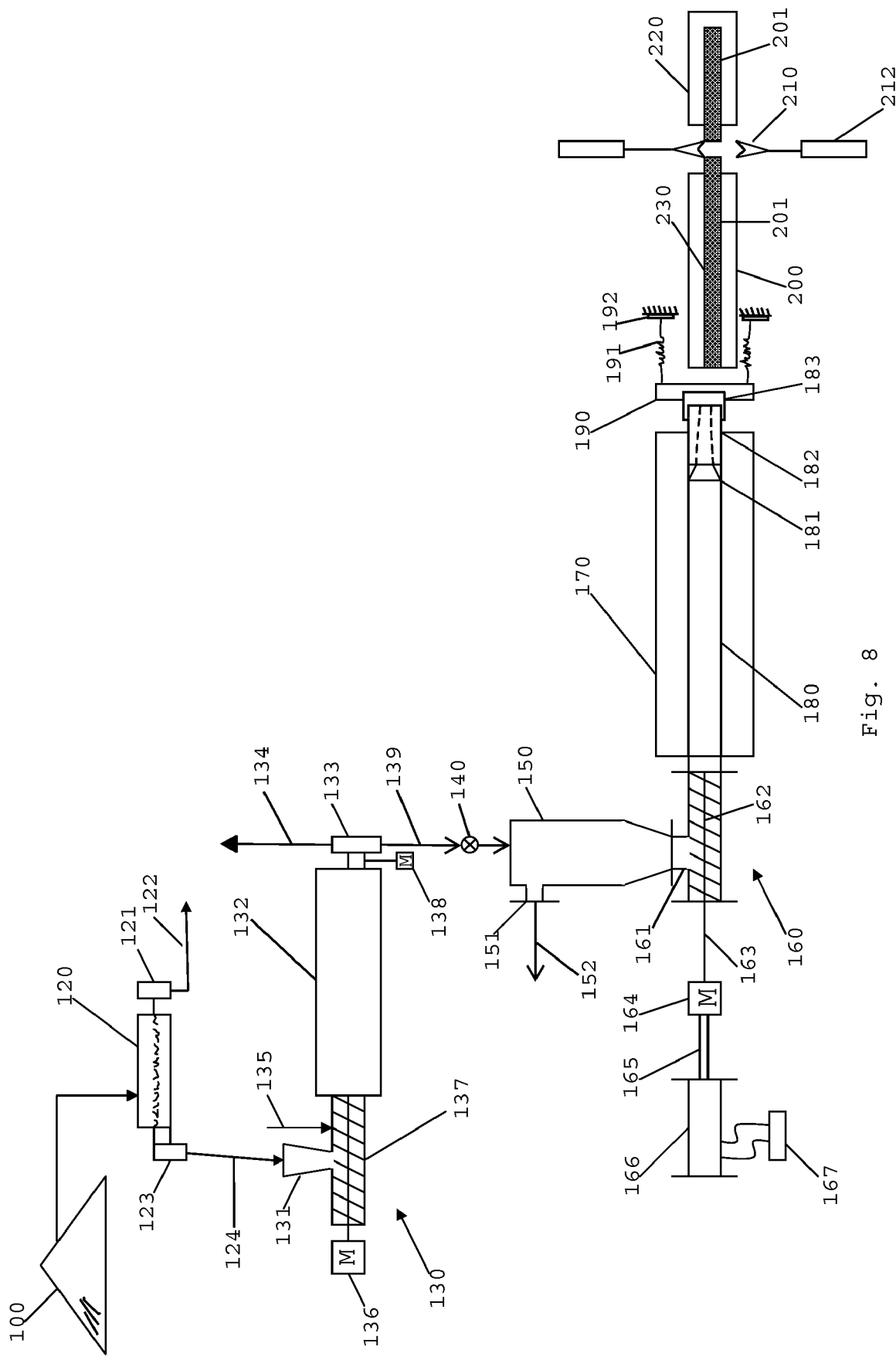
FIG. 8 is a schematic flowchart depicting an apparatus and method of processing waste mineral materials.

Referring to FIG. 8, raw material for synthetic hybrid rock manufacture 100, may be for example mine tailings, waste rock, quarry fines, slimes, fly ash, bottom ash, coal ash, incinerator ash, wood ash, slag, or blends of these materials with each other or with pure ceramic feed materials such as clay, feldspar, quartz, talc, and the like. Silicate waste materials are particularly well-suited for use as raw material. Raw material 100 is delivered to screening apparatus 120, which has an outlet 121 for oversize particles 122 with a size larger than a predetermined screen opening size, and which further has an outlet 123 for undersize particles 124 with a size smaller than a predetermined screen opening size. Oversize particles 122 may be recycled to screening apparatus 120 via a grinding process (not shown), or disposed of.

Undersize particles of raw material 124 are conveyed to a hopper 131 of rotary calciner 130. Feed auger 137 is driven, for example by motor 136, and particulate raw material is thereby conveyed to a heated rotating barrel 132. Barrel 132 is heated by any of various means including but not limited to electric resistance heaters, gas burners, and exhaust or waste heat from other processes. Drive 139 rotates barrel 132, which may have a smooth interior surface, or alternatively may have a surface that is corrugated or otherwise roughened, for example with lifters, to provide a means for the material to be repeatedly lifted and dropped as it moves through the barrel. Barrel 132 is inclined at a shallow angle from horizontal in order to slowly drive the powder toward the discharge assembly 133. Calciner 130 optionally has gas inlet 135 for the addition of air or other gases and vent 134 for the removal of combustion products or other gaseous decomposition products. Calciner 130 is operated at temperatures below the point where the material begins to soften and sinter, but at elevated temperatures such that the material is preheated and dried. Other useful chemical transformations can be carried out in the calciner, including but not limited to combustion of organic materials, conversion of hydrated minerals to dehydrated oxides, desulphurization, decomposition of carbonates, and the like. The process temperature for each of these operations varies, but is generally in the range of 100 to 1000 degrees Celsius.

Calcined particulate material 139 exits at a temperature within this range, preferably about 800 to 1000 degrees Celsius, and passes through valve 140 to hopper 150. Valve 140 can be closed to provide a vacuum-tight seal between hopper 150 and calciner 130. Preferably valve 140 is a high-temperature rotary valve that can continuously flow material through while maintaining a pressure differential.

Hopper 150 is preferably thermally insulated, or alternatively provide with a source of heat to maintain the temperature of particulate material. Vacuum outlet 151 may be provided for connection to vacuum 152. Vacuum removes entrained and interstitial gas from particulate material and contributes to the production of void-free synthetic hybrid rock material from a subsequent extrusion step. Vacuum can also reduce the oxidation of minerals and can increase the variety or level of crystallization in the resulting product.

Outlet 61 of hopper 150 is connected to feeder 160 at inlet flange 161. Feeder 160 may function as a reciprocating ram, or as an auger, or as both. Auger 162 is rotated by shaft 163 and drive 164, thereby conveying particulate synthetic hybrid rock material forward into extruder barrel 180. The entire auger/drive assembly may be moved axially, for example by means of hydraulic ram 165 moving axially in hydraulic cylinder 166 due to pressure created by pump or hydraulic power unit 167. The axial motion of auger 162 also conveys particulate material into extruder barrel 180.

A typical operation cycle for using both auger and ram aspects of the invention together is as follows. Under little, or none, or perhaps backward force from the hydraulic ram 165, drive 164 rotates auger 162, which conveys particulate material into extruder barrel 180. When the available space in extruder barrel 180 is filled with newly conveyed particulate material, drive 164 is shut down and auger 162 stops rotating. Ram 165 is then energized by power unit 167 to provide an axial force on auger 162, which in turn pushes on material in extruder barrel 180. Material is conveyed axially down extruder barrel 180 in this manner for a predetermined distance. Once said predetermined distance has been reached, the force applied by hydraulic ram is reduced, and the cycle may be repeated.

Extruder barrel 180 may be constructed from a material with excellent resistance to high temperatures, good thermal conductivity, acceptable strength, and excellent resistance to wetting by or reaction with materials to be processed in the extruder. Preferably, extruder barrel 180 is constructed from silicon carbide (SiC). Most preferably, extruder barrel 180 is constructed from nitride-bonded silicon carbide (SiN—SiC), for example Advancer™ material available from St. Gobain Industrial Ceramics.

Extruder barrel 180 is compressed between feeder 160 and spider 190 and supported within furnace 170. Furnace 170 provides heat, for example by electrical resistance heaters or by gas combustion, and is preferably a split-tube design for ease of maintenance, and also preferably has multiple zones of temperature control along its length. Furnace 170 provides heat to increase the temperature of extruder barrel 180 high enough to fuse, sinter, partially melt, or otherwise accomplish the desired vitrification of the material within.

Within extruder barrel 180, particulate material fed by feeder 160 is conveyed axially toward reducer die 181 and heated, thereby consolidating and vitrifying particulate material into at least partially molten synthetic hybrid rock material.

Reducer die 181 connected to the end of extruder barrel 180 provides a resistance to the flow of said at least partially molten synthetic hybrid rock material and thereby increases the necessary pressure applied by ram 165 to convey the material, providing a mechanism for consolidation of the material. Optional land die 182 connected to the end of reducer die 181 may further increase the resistance to flow. In the absence of land die 182, a spacer may be used, for example an additional short length of barrel similar to extruder barrel 180. At the discharge end of the extruder, that is where the land die or spacer exits furnace 170, an insulator ring 183 made of strong, thermally insulating material, preferably zirconia, is placed. Insulator ring 183 minimizes heat conduction from the furnace to spider 190, and is captured in a recessed opening within spider 190.

Spider 190 is a stiff plate that allows passage of extruded synthetic hybrid rock product 130 through a hole in the center while providing mechanical compression to insulator ring 183, land die 182, reducer die 181 and extruder barrel 180. Spider 190 is supported by a plurality of stiff springs 191, each reacting against a load cell 192 mounted on a fixed rigid support.

Extruded synthetic hybrid rock product 130 exits land die 182, proceeds through insulator ring 183 and spider 190, and is supported and conveyed by a plurality of rollers 201 within heated chambers 200 and 220. The temperature in heated chambers 200 and 220 is maintained such that extruded synthetic hybrid rock material 230 remains deformable enough to be cut by cutters 210 attached to actuators 212. After cutting, extruded synthetic hybrid rock material 230 may be removed from heated chamber 220 and cooled by various means to produce useful products. Alternatively, extruded synthetic hybrid rock material 230 may be conveyed to subsequent operations such as pressing, forming, rolling, molding, or glazing at a high temperature, thereby efficiently using the heat in the material.

We claim:

1. A composition comprising clasts fused together by a glass phase, wherein the glass phase is solid and directly bonds to the clasts, wherein the glass phase comprises a crystallite, wherein at least a portion of the composition has plasticity such that the composition is plastically deformable in a certain temperature range.

2. The composition of claim 1, wherein at least a portion of said crystallite is selected from the group consisting of pyroxene, plagioclase feldspar, wollastonite, a sulfate mineral, enstatite, bronzite, hypersthene, augite, diopside, pigeonite, plagioclase, anhydrite, maghemite, ilmanite, rutile, cordierite and combinations thereof, optionally wherein said crystallite has lath morphological characteristics or equant blocky morphological characteristics.

3. The composition of claim 1, wherein said clasts are crystalline clasts or noncrystalline clasts, wherein said crystalline clasts are monomineralic or polymineralic.

4. The composition of claim 1, wherein said clasts comprise a material selected from the group consisting of quartz, plagioclase feldspar, pyroxene, degraded chlorite, sphene, hematite, mineraloid grain, glass spherule, and combinations thereof.

5. The composition of claim 1, wherein the composition has a water absorption of less than 7%.

6. The composition of claim 1, wherein the amount of the glass phase is less than 20 weight percent of the composition.

7. The composition of claim 1, wherein said glass phase is heterogeneous and comprises aluminum, silicon, and lesser concentrations of cations, optionally wherein said cations comprise potassium, calcium, sodium, magnesium, or iron.

8. The composition of claim 1, wherein the composition is formed from mine tailings, or silicate waste materials selected from the group consisting of mine development rock, fly ash, bottom ash, slag, quarry fines, slimes, and combinations thereof.

9. The composition of claim 1, wherein the glass phase is continuous.

10. The composition of claim 1, wherein the composition comprises no clay.

11. The composition of claim 1, wherein the glass phase is continuous such that the glass phase surrounds the crystallite.

12. The composition of claim 1, wherein the composition comprises clay.

13. The composition of claim 1, wherein the crystallite comprises pyroxene, wherein the glass phase is continuous such that the glass phase surrounds the crystallite.

14. The composition of claim 1, wherein the clasts comprise silicate waste materials.

15. The composition of claim 1, wherein the glass phase is distributed as a matrix with the clasts interspersed therein.

16. The composition of claim 1, wherein the crystallite is formed from a melt with a mineral composition comprising a mineral selected from the group consisting of wollastonite, plagioclase feldspar, anhydrite, hydrous calcium sulfate and combinations thereof.

17. The composition of claim 1, wherein the composition has an open porosity of less than 0.5 percent.

18. The composition of claim 1, wherein the composition has a modulus of rupture in the range of about 6,060 to 12,320 psi.

19. The composition of claim 1, wherein the composition has a water absorption of less than 0.5 percent.

20. The composition of claim 1, wherein said portion of the composition is plastically deformable in the range of 1050-1300° C.

21. The composition of claim 1, wherein said portion of the composition is plastically deformable in the range of 1100-1200° C.

* * * * *